(12) United States Patent
Leman et al.

(10) Patent No.: US 7,950,139 B2
(45) Date of Patent: May 31, 2011

(54) METHOD OF MAKING A DEPOSIT ON AN SIC-COVERED SUBSTRATE

(75) Inventors: Frederic Leman, Montrouge (FR);
Sebastien Lukat, Mulhouse (FR);
Sophie Costil, Offemont (FR);
Christian Coddet, Giromagny (FR)

(73) Assignee: SNECMA, Paris (FR)

( * ) Notice: Subject to any disclaimer, the term of this patent is extended or adjusted under 35 U.S.C. 154(b) by 560 days.

(21) Appl. No.: 12/108,867

(22) Filed: Apr. 24, 2008

(65) Prior Publication Data

US 2008/0264175 A1 Oct. 30, 2008

(30) Foreign Application Priority Data

Apr. 30, 2007 (FR) ...................................... 07 54788

(51) Int. Cl.
*H01C 17/28* (2006.01)
(52) U.S. Cl. .......................................... 29/621.1; 29/595
(58) Field of Classification Search .................. 29/621.1, 29/25.35, 592.1, 593, 595; 73/727, 760, 73/763, 788, 862.041; 438/50, 960
See application file for complete search history.

(56) References Cited

U.S. PATENT DOCUMENTS

| 5,867,886 A * | 2/1999 | Ratell et al. ..................... 29/595 |
| 6,209,199 B1 | 4/2001 | Cornu et al. |
| 6,299,988 B1 | 10/2001 | Wang et al. |
| 6,516,872 B1 | 2/2003 | Cornu et al. |
| 7,360,437 B2 * | 4/2008 | Hardwicke et al. ............. 73/763 |

FOREIGN PATENT DOCUMENTS

| GB | 893571 | 4/1962 |
| JP | 10-310859 | 11/1998 |

OTHER PUBLICATIONS

U.S. Appl. No. 12/109,042, filed Apr. 24, 2008, Bertrand, et al.

* cited by examiner

*Primary Examiner* — Thiem Phan
(74) *Attorney, Agent, or Firm* — Oblon, Spivak, McClelland, Maier & Neustadt, L.L.P.

(57) ABSTRACT

The invention relates to a method of depositing a coating on a part having its surface made of silicon carbide. The method comprises the following steps:
a) applying laser treatment to the SiC surface by superposing laser impacts for the purpose of increasing the roughness of said surface; and
b) depositing a coating on the SiC surface by atmospheric thermal spraying.

The invention also provides a device for measuring deformation, which device comprises a first alumina coating obtained by atmospheric thermal spraying onto the silicon carbide layer covering the substrate of the part after it has been treated by superposing laser impacts, a free filament strain gauge placed on the coating, and an additional alumina coating obtained by atmospheric thermal spraying onto the strain gauge.

4 Claims, 1 Drawing Sheet

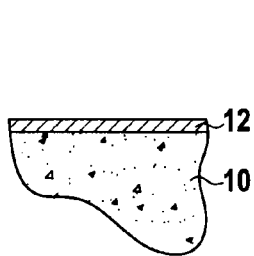 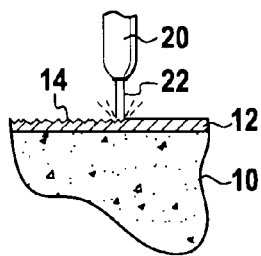 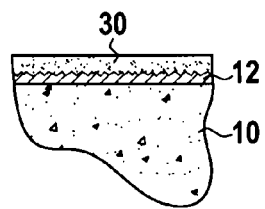
FIG.1A   FIG.1B   FIG.1C
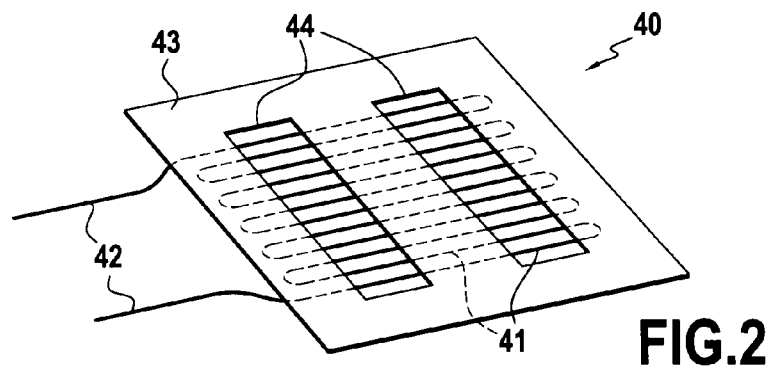
FIG.2
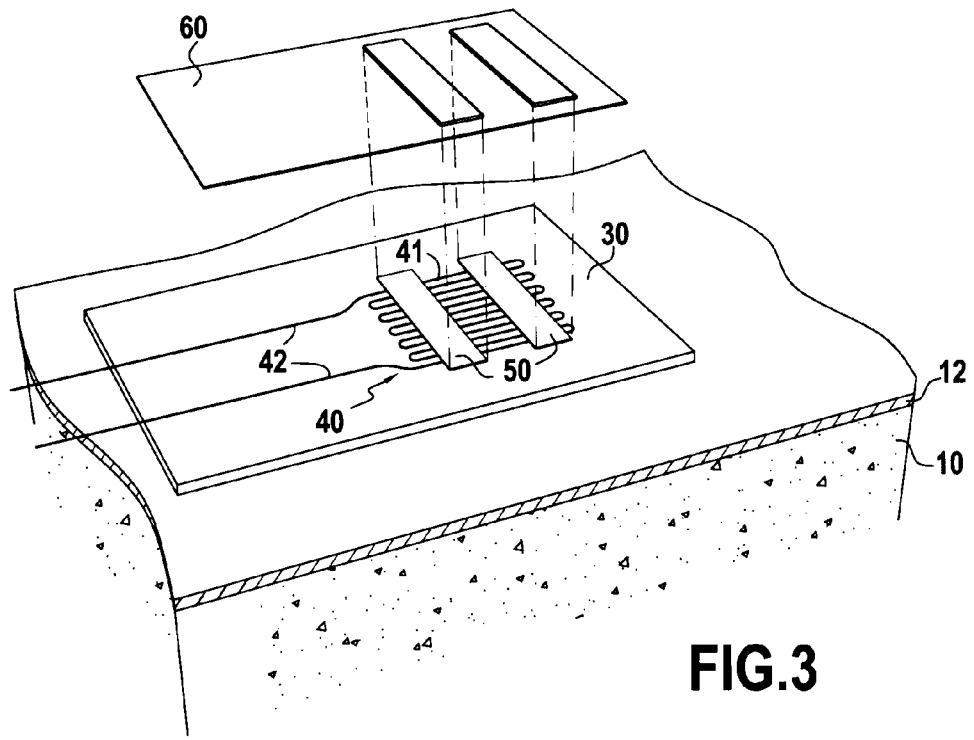
FIG.3

METHOD OF MAKING A DEPOSIT ON AN SIC-COVERED SUBSTRATE

The present invention relates to a method of depositing a coating on a part having its surface made of silicon carbide (SiC).

BACKGROUND OF THE INVENTION

The part may be a solid SiC part, or a part having a substrate that is not made of SiC and that is covered in an SiC layer. Parts comprising a substrate covered in an SiC layer are used in high temperature applications, i.e. applications for temperatures in the range 300° C. to 1100° C. By way of example, the substrate may be a ceramic matrix composite (CMC), i.e. a ceramic matrix reinforced by ceramic or carbon fibers, for example. The SiC layer is to give the part better resistance to oxidation and better mechanical properties at high temperatures. Because of these properties, such parts are used in particular in aviation turbomachines.

In certain applications, it is necessary to deposit a coating on the SiC surface, e.g. a coating of metal or ceramic. In particular, it is possible to deposit a ceramic, such a ceramic coating being for the purpose of improving the high temperature performance of the part on which it is deposited. Deposition may be performed either by atmospheric thermal spraying or by means of a cement. Typically, the deposited ceramic is alumina ($Al_2O_3$), which is thus deposited either by atmospheric thermal spraying of alumina (atmospheric plasma spraying of a powder or flame spraying of a wire), or else in the form of an alumina-based cement, or indeed by combining those methods, which are well known in the state of the art.

Mechanical and thermal testing carried out on parts having SiC surfaces covered in a ceramic coating show that the main failure mode is rupture at the interface between the SiC surface and the ceramic coating, probably because of the physicochemical properties of the SiC surface.

In order to improve the tenacity of the interface, modifications have been made to the state of the SiC surface. Thus, sand blasting (using compressed air to blow particles of alumina having a diameter of a few hundreds of micrometers) has been performed on the SiC surface in order to increase its roughness. Nevertheless, sand blasting leads to damage to the SiC surface without creating favorable roughness.

The present invention seeks to remedy those drawbacks.

OBJECTS AND SUMMARY OF THE INVENTION

The invention seeks to provide a method of making a coating on a part with a surface of silicon carbide (SiC) and that enables the tenacity of the interface between the SiC surface and the coating to be improved.

This object is achieved by the fact that the method comprises the following steps:

a) applying laser treatment to the SiC surface by superposing laser impacts for the purpose of increasing the roughness of said surface; and b) depositing a coating on the SiC surface by atmospheric thermal spraying.

By means of the repeated impacts of the laser beam on the SiC surface, the roughness of this surface is increased, thereby enhancing the mechanical anchoring of the coating on the SiC surface. In addition, the laser beam modifies the physicochemical state of the SiC surface, thereby enhancing physicochemical bonding between the coating and the SiC surface. Thus, the interface between the part and the coating is better at withstanding high temperatures.

For example, the material constituting said coating is alumina.

Alumina is typically used as a coating since it is a material that provides good electrical insulation at high temperatures.

Parts having the substrate covered in a layer of silicon carbide (SiC) are commonly used in high temperature applications as mentioned above. It is necessary to optimize the dimensioning of said parts, for reasons of size, weight, and expense. This dimensioning is performed in particular by laboratory testing or by testing under working conditions, during which deformations of such parts under thermomechanical stressing are studied. In order to be able to measure such deformations, use is made of strain gauges, typically free filament gauges (it is also possible to thin layer gauges, but their complex deposition techniques make them used less widely). Such gauges comprise an alloy filament that is fastened on the part. When the part deforms, the filament is stretched or contracted, thereby leading to a corresponding variation in its electrical resistivity. By passing a current through the filament, it is possible, in real time, to measure the variations in the electrical resistivity of the filament, and as a result to measure the deformations of the part on which it is fastened. In order to measure such deformations effectively, it is essential to ensure that the gauge adheres securely to the surface of the part, so that deformations of the surface of the part are transmitted effectively to the gauge. Typically, the gauge is placed on a first alumina coating previously deposited on the part, and then the gauge and said first coating are covered in an additional alumina coating that holds the gauge in intimate contact with the first coating.

Nevertheless, it can happen that the first coating separates from the surface of the part, so the gauge does not act effectively in measuring the deformation of the surface of the part, and the measurements taken are not reliable. As mentioned above, for parts having a substrate covered in SiC and that are covered in an alumina coating of the state of the art, delamination can occur at high temperatures at the part/coating interface. Such delamination occurs even when the SiC layer has been subjected to sand blasting. It is therefore necessary to improve the adhesion between the first ceramic coating and the SiC layer, and thus with the underlying part. This better adhesion is obtained by using the above-described laser treatment of the SiC layer.

Consequently, the invention also provides a method of making a device for measuring deformation of a substrate coated in an SiC layer deposited by chemical vapor deposition, the method comprising the following steps:

a) applying laser treatment to the SiC layer by superposing laser impacts for the purpose of increasing the roughness of said layer;

b) depositing an alumina coating on the SiC layer by atmospheric thermal spraying;

c) placing a free filament strain gauge on the coating, the gauge being held on its support, and the support possessing openings;

d) depositing a second alumina coating on the strain gauge and on the coating by atmospheric thermal spraying through the openings;

e) removing the support; and f) depositing a third alumina coating by atmospheric thermal spraying on the coating, on the second coating, and on the strain gauge.

The invention also provides a device for measuring deformation of a part constituted by a substrate covered in a layer of silicon carbide (SiC) deposited by chemical vapor deposition.

According to the invention, the device comprises a first alumina coating deposited by atmospheric thermal spraying onto the silicon carbide layer after it has been treated by superposing laser impacts, a free filament strain gauge placed on the first coating, and an additional alumina coating deposited on the strain gauge by atmospheric thermal spraying.

Because of the repeated impacts of the laser beam on the surface of the SiC layer, the roughness of said surface increases, thereby enhancing mechanical anchoring of the coating on the SiC layer. In addition, the laser modifies the physicochemical state of the surface of the SiC layer, thus improving physicochemical bonding between the coating and the SiC layer.

Thus, the interface between the part and the coating is better at withstanding high temperatures, and the strain gauge remains secured to the SiC layer and thus to the part whose deformation is to be measured at high temperatures. Consequently, it is possible to take more accurate measurements of the deformation of the part on which the gauge is fastened.

BRIEF DESCRIPTION OF THE DRAWING

The invention can be better understood and its advantages appear more clearly on reading the following detailed description of an implementation given by way of non-limiting example. The description refers to the accompanying drawing, in which:

FIGS. 1A, 1B, and 1C show the steps of the method of the invention applied to a substrate covered in a layer of SiC;

FIG. 2 is a perspective view of a strain gauge on its support; and

FIG. 3 is an exploded perspective view of a device of the invention for measuring deformation.

MORE DETAILED DESCRIPTION

FIG. 1A shows a part for use in very high temperature applications, having a substrate 10 that is covered in a layer 12 of silicon carbide (SiC). By way of example, the substrate 10 is made of a ceramic matrix composite material, or of a self-healing ceramic matrix composite material. The composite material may be SiC or it may be formed by a plurality of refractory ceramic layers that are precursors of glass in the silicon boron carbon (Si—B—C) ternary system. Such composites are reinforced, for example, by fibers made of carbon or ceramic. In applications to aviation turbomachines, such parts are typically thin parts, of frustoconical or plane rectangular shape, and they present a size of the order of a few hundreds of millimeters.

The SiC layer 12 deposited on the substrate is deposited, for example, by the technique known as chemical vapor deposition.

FIG. 1B shows the same part, with a laser 20 emitting a laser beam towards the SiC layer 12. The laser beam impacts the SiC layer 12 repeatedly, thereby creating roughnesses 14 on said layer 12, and causing the physicochemical state of the surface of said layer 12 to be modified. The result is better adhesion of a coating deposited on the SiC layer 12, compared with the adhesion of an SiC layer that has not been subjected to such laser treatment. The parameters of the laser treatment (type of laser, fluence (energy per unit area), pulse duration, laser impact frequency, relative speed of movement between the laser and the part, . . . ) are selected in such a manner as to obtain the best possible bonding between the coating and the SiC layer 12. The number N of laser impacts on each point on the surface is given by the following formula, in which V is the speed of movement of the laser relative to the part, d is the dimension of the laser beam in the direction of said movement, and v is the frequency of the laser impacts (number of laser impacts per second):

$$N = \frac{d}{V} \cdot v$$

Typically, with a pulsed Nd:YAG laser, with a pulse duration of 10 nanoseconds (nm), the number N of laser impacts on each point on the surface lies in the range 90 to 1000, the fluence of the laser lies in the range 1.8 joules per square centimeter ($J/cm^2$) to 2 $J/cm^2$. For example, it is possible to use an Nd:YAG laser with a beam size of 8 millimeters (mm) by 4 mm and an impact frequency v of 120 hertz (Hz), and to operate the treatment with fluence of 2 $J/cm^2$ and a relative laser/part speed V of 1 millimeter per second (mm/s). This gives a number N that is equal to 480, for the laser moving in the direction of the short dimension of its beam.

Preferably, a pulsed Nd:YAG laser is used having a pulse duration of 10 ns, with a number N of laser impacts on each point on the surface lying in the range 200 to 500, and with fluence of 2 $J/cm^2$.

FIG. 1C shows the same part as FIG. 1B, on which a coating 30 has been deposited. Typically, this coating 30 is made of a ceramic such as mullite ($3Al_2O_3$ $2SiO_2$) zirconia $ZrO_2$, or alumina $Al_2O_3$.

This coating 30 is typically deposited by atmospheric thermal spraying. Deposition by atmospheric thermal spraying is generally preferred over depositing a cement, since a cement would tend to crack at high temperatures. Deposits made by atmospheric thermal spraying are more cohesive and tenacity. "Thermal spraying" denotes a group of surface coating methods in which fine particles of the material for deposition are deposited in a molten or semi-molten state on the substrate. Atmospheric thermal spraying can be plasma spraying or flame spraying. Those two techniques are known, so only their general principles are summarized below.

The plasma spraying technique is a thermal spraying technique using a blown arc plasma torch that consists in introducing into a very high energy jet (a plasma jet), the material for deposition in powder form (i.e. in the form of particles, the particles having a mean diameter of a few tens of micrometers). The particles are then melted by the source and simultaneously accelerated towards the part for coating. The particles thus flatten against the surface of the part in the form of droplets that solidify very quickly after impact by their heat being conducted away, thereby forming platelets on the surface of the part. Stacking these platelets perpendicularly to the surface of the part causes the deposit to be built up progressively. The spraying is performed at atmospheric pressure in air. The speed of growth of the coating is of the order of 100 micrometers (μm) per minute.

The flame spraying technique consists in introducing into the flame of an oxyacetylene torch a wire (rod) of the material that is to be sprayed onto the surface of the part. The material is then melted, atomized into fine particles that are accelerated towards the part for coating, and they flatten on the surface thereof in the form of droplets that solidify very quickly after impact by their heat being conducted away, thereby forming platelets on the surface of the part. Stacking these platelets causes the deposit to be built up progressively.

Spraying is formed in air at atmospheric pressure. The speed of growth of the coating is of the order of 100 μm per minute.

Tests have been performed by the Applicant on parts having a ceramic matrix composite substrate with an SiC layer after being subjected to laser treatment as described above, and on the same parts that were not subjected to laser treatment. All of the parts were then coated in alumina by flame spraying. Thermal fatigue tests (for 60 cycles, each cycle comprising: raising the temperature to 1100° C., maintaining it for one hour at 1100° C., cooling in air down to 300° C.) have shown that parts having their SiC layers subjected to laser treatment did not present any trace of delamination at the SiC/alumina interface, unlike the parts in which the SiC layer was not subjected to laser treatment.

Parts obtained by the method of the invention when the coating is made of alumina are typically parts used in aviation turbomachines, for example nozzle flaps, mixers, and combustion chamber elements.

In accordance with the invention, a device is made for measuring deformation on a part constituted by a substrate on which an SiC layer had been deposited by chemical vapor deposition (by way of example, the substrate could be made of one of the ceramic composites mentioned above). The measurement device comprises a free filament strain gauge used for measuring deformations of the part.

FIG. 2 shows a free filament strain gauge 40. Such a strain gauge is known to the person skilled in the art, and only its general structure is summarized below. The strain gauge 40 comprises a filament that is accordion-shaped as follows: the filament is folded back along itself a first time to form a U-shape of given height, then it is folded back a second time to form a second U-shaped situated in the same plane of the first U-shape and having limbs of the same length, but the other way up. The filament is thus curved back along itself numerous times using the same process, while ensuring that the limbs of the U-shape do not touch, so as to form a grid 41 in a plane. The limbs of consecutive U-shapes thus constitute strands of the grid 41, which strands are mutually parallel. The grid 41 is generally rectangular in shape, and is extended on one side by two filament ends 42 extending respectively from the first limb of the first U-shape and from the last limb of the last U-shape of the grid 41. The ends 42 are substantially parallel and lie in the same plane as the grid 41. The strain gauge also comprises a support 43. Typically the support 43 is an adhesive ribbon on which the grid 41 is stuck. The support 43 thus enables the configuration of the grid 41 to be maintained while the strain gauge 40 is being handled, in particular so as to keep the loops of the U-shapes in place together with the strands constituting the grid 41 so that the strands do not touch (so as to avoid a short circuit in the filament). The support 43 has a rectangular shape that extends beyond the grid 41 so that only the ends 42 of the filament extend beyond the support 43. The support 43 is oriented in such a manner that two of its sides are parallel to the strands of the grid 41, and its other two sides are perpendicular thereto. The ends 42 of the filament are connected to electrical equipment for passing an electric current along the filament, so as to measure in real time variations in the electrical resistivity of the filament, and thus deformations of the part on which it is fastened. When the part deforms in the direction of the strand forming the grid 41, the filament is stretched or caused to contract, and its electrical resistivity varies accordingly. It is for the purpose of increasing measurement sensitivity that the filament is folded back several times along itself to form a grid 41 as described above. Two rectangular openings 44 are cut out in the support 43 so that their long dimensions extend perpendicularly to the strands forming the grid 41. The openings 44 are long enough to reveal all of the strands of the grid 41 in these openings. The width of the openings 44 (in the strand direction) is limited so as to cover only a small fraction of the surface defined by the grid 41. Thus, the major fraction of the length of the filament constituting the grid 41 remains stuck to the support 43. One of the openings 44 is situated towards the end of the grid 41 that is closer to the filament end 42, and the other opening 44 is situated towards the other end of the grid 41.

The filament of the strain gauge 40 is made of a metal alloy, e.g. a nickel chromium (Ni—Cr) alloy, an iron-chromium-aluminum (Fe—Cr—Al) alloy, or a platinum-tungsten (Pt—W) alloy. By way of example, the diameter of the filament is 18 μm in the grid 41, and 76 μm in the ends 42.

The device for measuring deformation of the part is made as follows: the SiC layer 12 (previously deposited on the substrate 10 of the part by chemical vapor deposition) is initially treated by superposing laser impacts, as mentioned in the description of FIG. 1B. The laser treatment creates roughness 14 on the SiC layer 12. Thereafter, a first alumina coating 30 is deposited on a portion of the layer 12 by atmospheric thermal spraying (plasma spraying or flame spraying). For example, it is possible to use a ground and melted alumina powder of grain size lying in the range 22 μm to 45 μm, which powder is sprayed by means of a plasma torch with a mixture comprising argon with 30% by volume of hydrogen and at a powder of 45 kilowatts (kW). The roughnesses 14 in the SiC layer 12 provide good adhesion for the first coating 30 of alumina on said layer 12.

Thereafter, the strain gauge 40 is placed on the first coating 30 of alumina, with the support 43 being above the grid 41. In this example the first coating 30 of alumina serves to insulate the strain gauge 40 from the substrate. The gauge 40 is held in place by the support 43 and a second coating 50 of alumina similar to the first is deposited on the grid 41 through the windows 44. The second coating 50 is likewise deposited by atmospheric thermal spraying. This second layer 50 is thus in the form of two rectangular strips, each having area equal to the area of one of the windows 44 and deposited in the location of one of said windows 44. The second coating 50 is thus directly in contact with the filament of the grid 41, and holes of filament on the first coating 30. It is then possible to remove the support 43, the grid then being held in place by the second coating 50. Thereafter, a third coating 60 of alumina (similar to the first two coatings) is deposited by atmospheric thermal spraying so as to cover the second coating 50, the portions of the grid 41 that are not covered by the second coating 50, and a portion of the ends 42. The two tips of the ends 42 are not covered by the third coating 60 so as to allow them to be connected to a source of electricity for measuring the deformation of the filament of the grid 41. By way of example, the first coating has a thickness of 100 μm, the second coating has a thickness of 50 μm, and the third coating has a thickness of 100 μm.

The second coating 50 and the third coating 60 together constitute an additional alumina coating that holds the strain gauge 40 on the first coating 30, the strain gauge 40 thus being embedded in the alumina of the first coating 30 and of the additional coating. Because of the roughnesses 14 in the SiC layer 12, the alumina block constituted by the first coating 30 and the additional coating is secured to the part, even at the high temperatures (300° C. to 1100° C.) to which the part is subjected in operation (e.g. in an aviation turbomachine). Thus, deformation of the part is properly transmitted to the alumina block, and thus to the filament of the strain gauge 40, which enables accurate measurements to be taken of the deformation of the part.

The above-described method of depositing the strain gauge 40 on the first layer 30 is given by way of example, the principle being the same for depositing any other free filament strain gauge, providing that, at the end of the deposition method, the filament of the strain gauge 40 is embedded in the alumina block that is constituted by the first coating 30 and by the additional coating.

The method of making a coating on a substrate having its surface made of SiC, as described in the present invention, also covers circumstances in which the coating is made on a solid SiC part.

What is claimed is:

1. A method of making a deformation measurement device, the method comprising the following steps:
   a) applying laser treatment to the SiC surface of a part constituted by a substrate covered in an SiC layer deposited by chemical vapor deposition, the laser treatment comprising superposing laser impacts for the purpose of increasing the roughness of said surface;
   b) depositing an alumina coating on said SiC surface by atmospheric thermal spraying;
   c) placing a free filament strain gauge on said coating, the gauge being held on its support, and said support having openings;
   d) depositing a second alumina coating on the strain gauge and on the coating by atmospheric thermal spraying through said openings;
   e) removing said support; and
   f) depositing a third coating of alumina by atmospheric thermal spraying on said first coating, on said second coating, and on said strain gauge.

2. The method according to claim 1, wherein the laser is an Nd:YAG laser having a pulse duration of 10 ns, the number of laser impacts per surface point lying in the range 200 to 500, and the fluence of the laser being 2 $J/cm^2$.

3. The method according to claim 1, wherein the atmospheric thermal spraying is selected between plasma spraying and flame spraying.

4. The method according to claim 1, wherein said substrate is selected between a composite material having a silicon carbide matrix and a composite material having a self-healing ceramic matrix.

* * * * *